April 1, 1947.     J. R. JAMES ET AL     2,418,264

DRIFTMETER

Filed July 5, 1944

Inventor
J. R. James
R. Keyzer-Andre
By Mason Fenwick + Lawrence
Attorneys

Patented Apr. 1, 1947

2,418,264

UNITED STATES PATENT OFFICE 2,418,264

DRIFTMETER

Joseph R. James and René Keyzer-André, Miami, Fla., assignors of one-third to John E. Norman, Miami, Fla.

Application July 5, 1944, Serial No. 543,550

4 Claims. (Cl. 88—1)

This invention relates to optical instruments, and more particularly to such instruments for determining the angular relationship between lines or courses, and is particularly suited for use as a driftmeter for aircraft.

It is well known that a number of driftmeters are used at present which employ optical systems of various combinations of spherical lenses with which to view the terrain over which aircraft are flying. The majority of these driftmeters are provided with a frosted screen upon which is etched a series of grid lines. In operation, the operator focuses his instrument until the image of some definite object below is sharply formed upon the screen. The movement of the image across the screen is watched, and the screen rotated until the path of movement of the image is parallel to the grid lines. When this is accomplished, the operator has the supposed drift of the aircraft and can read the deviation on whatever scales are provided. The image must be observed for an appreciable length of time to discern with any degree of accuracy that the image is following a path parallel to the grid lines. The degree of accuracy varies with the operator's ability to determine parallelism between image path and grid lines. The use of such an instrument is far too time-consuming, and the results are not always accurate.

The object of the present invention is to provide an optical instrument through which drift may be discovered instantly, and deviation determined with dispatch and accuracy.

Another object of the invention is to provide such an instrument which gives a direct view of objects below, the objects having a normal appearance and no apparent movement when the aircraft is following a true course with no drift, but having a rather rapid sidewise movement when the aircraft is drifting.

A further object of the invention is to provide such an instrument wherein the following of the path of an object below and comparing the course to grid lines or other scale marking is eliminated.

A still further object of the invention is the provision of a driftmeter by means of which the operator can measure drift even though the terrain below may be devoid of distinctive markings, such as desert country, grassy plains, or water.

It is an object of the invention to provide an instrument of super-sensitivity by providing means to multiply the appearance of error.

Other objects of the invention will be apparent from the following detailed description in conjunction with the drawings which accompany and form a part of this specification.

In the drawings, throughout the several figures of which the same characters of reference are applied to identical parts:

Figure 1:
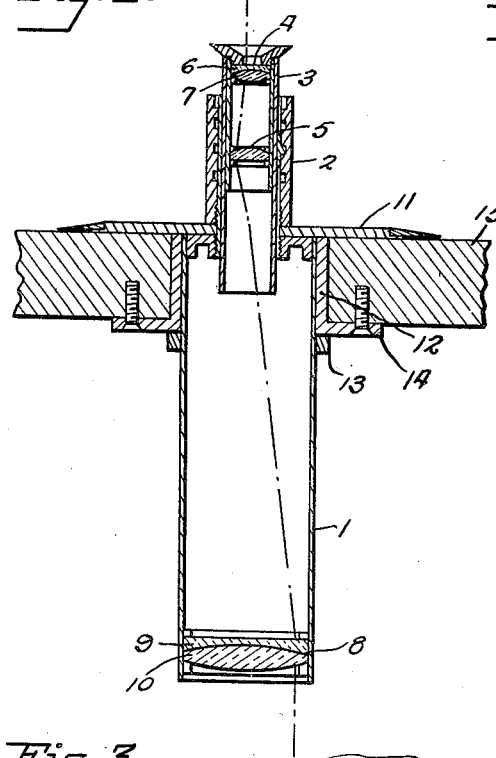
Figure 1 is a vertical section through a driftmeter embodying the principles of the present invention.
Figure 2:
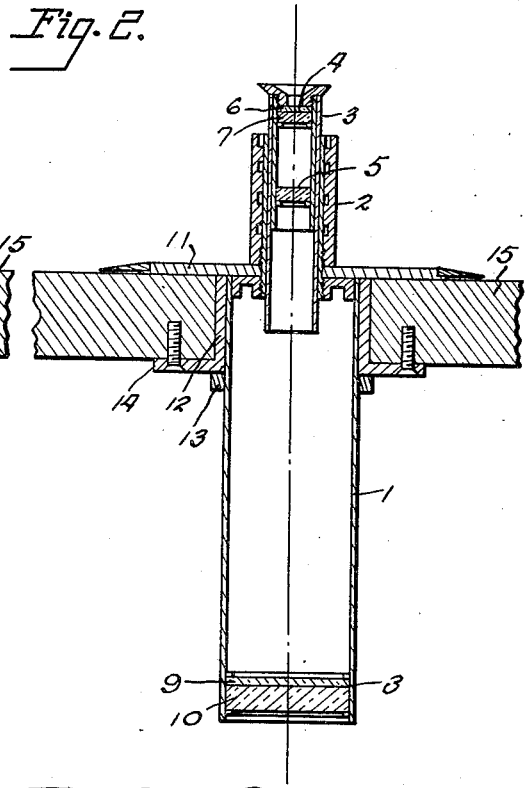
Figure 2 is a vertical section through the driftmeter taken at right angles to the view in Figure 1; and, Figure 3 is a top plan view of the instrument.
Figure 3:
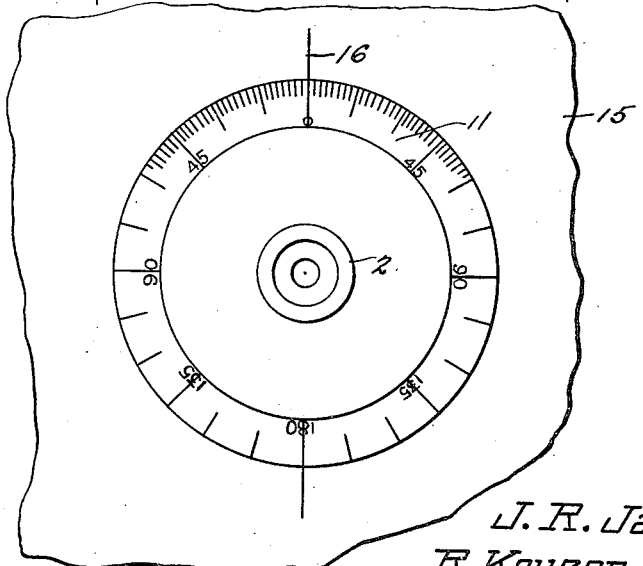

Referring to the drawings in detail, the instrument comprises a main tube 1 and a focusing tube 2, the two tubes being in axial alignment. The focusing tube embodies an eyelens tube 3 as a portion thereof, telescopically adjustable by means of the threaded section of the focusing tube 2. The eyelens tube is nonrotatable but has its movement limited to an axial direction only. The above structure is similar to the focusing arrangement of many well known optical instruments.

Within the eyelens tube are positioned an eyelens 4 and a field lens 5. The eyelens is achromatic and composed of two parts, a cylindrically ground plano-concave lens 6, and a cylindrical double convex lens 7. The field lens 5 is spaced from the eyelens and is in the form of a plano-convex cylindrical lens. The axes of the two lens are in alignment.

The main tube 1 carries near its lower end an objective lens 8. This lens is also a two part achromatic lens, composed of the plano-concave cylindrical portion 9 and the double convex cylindrical portion 10. The neutral axis of this lens is in alignment with the neutral axis of the eyelens and the neutral axis of the field lens.

Fixed to the upper end of the main tube is a flat disc 11, marked off around its peripheral edge into degrees, and so positioned with respect to the lens system that the zero marking is aligned with the neutral axis of the system. A collar 12 surrounds the upper portion of the main tube and forms a bearing within which the tube may be rotated. The disc 11 rests upon the top edge of the collar 12 and a ring 13 about the tube beneath the collar prevents longitudinal movement of the tube. The collar 12 is provided with a horizontal flange 14 to fixedly position the collar 12 upon a support 15. The disc 11 is above the supporting table or platform and the table is marked with a line 16 parallel to the lubber line of the ship.

When the zero marking on the disc 11 is coincident with the line 16, the neutral axis of the lens system is then in parallelism with a fore and aft line passing through the center of the ship.

As is well known in the art, there is no refraction of light passing through a cylindrical lens in the plane of its axis, and, therefore, there will be no distortion of objects viewed through the lens system disclosed as long as those objects passing beneath the aircraft are in parallelism to the axis of the lens system, as would be the case with the disc 11 set at zero and the aircraft flying a true course with no drift. With conditions as indicated above, objects viewed by the observer will appear absolutely normal, or, in other words, the objects will appear as they would to the naked eye. Fixed objects will appear fixed and motionless as they would from any moving vehicle.

If, however, the aircraft is drifting, the objects below take on motion and appear to move rapidly across the lens. As the magnification of a cylindrical lens is across the axis, the slightest deviation from a true axial course will be instantly discernible to an exaggerated degree. A ninety degree rotation of the lens system causes the object viewed to rotate one hundred and eighty degrees, resulting in an apparent error of twice the value of any deviation from a line of travel coincident with the neutral axis of the system.

In the use of the device, the observer will look through the instrument at the terrain below. If the objects viewed appear motionless, he will know that the plane is following a true course with no drift. If the objects viewed appear to move transversely across the lens, the plane is drifting. To determine the amount of drift, the entire instrument is rotated in its bearing collar until all appearance of motion in the object viewed ceases. The neutral axis of the instrument will then be aligned with the actual course of the plane. The deviation may then be ascertained by viewing the scale marked upon the disc 11. The amount that the disc has been rotated from its zero setting will represent the angle of deviation.

The use of this instrument requires no mathematical calculations, as the device need only be rotated until the object below ceases to have the appearance of movement. This provides a simple means for ascertaining drift, and one that will give the deviation angle almost instantly.

If the terrain traversed is devoid of discernible markings, such as when traveling over desert, grassy plains, or water, the true ground track of the plane may be determined by rendering the instrument out of focus. At night a view of celestial bodies will serve equally as well in determining drift as do terrestial objects by day.

The use of the optical instrument disclosed herein is not limited to that of a driftmeter, as it would be equally useful as a plumb or level. Any object viewed through the instrument if not in absolute alignment with the optical axis will appear so far in error that it will be immediately noticed. This is also true if the instrument is used to check the square of the weave in textiles, as it will be readily discernible whether two lines are at exactly right angles to one another.

It is evident that the instrument is capable of many other uses, and though a specific embodiment of the inventive concept has been described and illustrated, many other arrangements and combinations of cylindrical, and cylindrical and spherical lenses may be used to accomplish the same purpose. The invention is to be limited only by the scope of the appended claims.

Having thus described our invention, we claim:

1. A driftmeter for aircraft comprising a cylindrical eyelens and a cylindrical field lens, a focusing tube within which the two said lenses are mounted, a cylindrical objective lens, a main tube coaxial with said focusing tube carrying said objective lens, all of said lenses having their neutral transverse axes in alignment, a bearing for said main tube whereby said main and focusing tubes may be rotated about their common longitudinal axis, and a flange carried by and rotatable with said main tube and having graduations thereon whereby the degree of rotation may be observed, the datum graduation on said flange being in diametrical alignment with the neutral transverse axes of the lenses, and a fixed reference marking for said scale.

2. A driftmeter for aircraft as claimed in claim 1, a reference marking for said scale, said marking being fixed in parallelism with the longitudinal axis of the aircraft.

3. A driftmeter for aircraft comprising a cylindrical lens of positive power, a tube within which the lens is fixedly mounted, a bearing for said tube whereby said tube may be rotated about its longitudinal axis, a drift scale carried by said tube, and a reference marking fixed with respect to the aircraft and coacting with said drift scale whereby the degree of rotation, and hence the drift, may be observed.

4. In a driftmeter for aircraft as claimed in claim 3, said reference marking being fixed in parallelism with the longitudinal axis of the aircraft.

JOSEPH R. JAMES.
RENÉ KEYZER-ANDRÉ.

REFERENCES CITED

The following references are of record in the file of this patent:

UNITED STATES PATENTS

| Number | Name | Date |
| --- | --- | --- |
| 2,166,046 | French | July 11, 1939 |
| 1,369,764 | Bijl | Feb. 22, 1921 |
| 1,466,416 | Whitaker | Aug. 28, 1923 |
| 1,942,536 | Clementi | Jan. 9, 1934 |
| 2,276,284 | Burka et al. | Mar. 17, 1942 |
| 848,757 | Lomb et al. | Apr. 2, 1907 |

FOREIGN PATENTS

| Number | Country | Date |
| --- | --- | --- |
| 284,483 | Great Britain | Feb. 2, 1928 |
| 250,784 | Germany | Sept. 18, 1912 |